(12) United States Patent
Daido et al.

(10) Patent No.: US 6,291,106 B1
(45) Date of Patent: Sep. 18, 2001

(54) ELECTROLYTIC-SOLUTION-SUPPORTING POLYMER FILM AND SECONDARY BATTERY

(75) Inventors: Takahiro Daido; Takeyuki Kawaguchi, both of Iwakuni (JP)

(73) Assignee: Teijin Limited (JP)

( * ) Notice: Subject to any disclaimer, the term of this patent is extended or adjusted under 35 U.S.C. 154(b) by 0 days.

(21) Appl. No.: 09/314,139

(22) Filed: May 19, 1999

(30) Foreign Application Priority Data

May 22, 1998 (JP) .................................................. 10-141359
Jun. 8, 1998 (JP) .................................................. 10-159372

(51) Int. Cl.$^7$ ...................................................... H01M 6/18
(52) U.S. Cl. ........................ 429/306; 429/309; 429/310; 429/314; 429/231.8
(58) Field of Search ................................... 429/306, 309, 429/310, 314, 231.8

(56) References Cited

U.S. PATENT DOCUMENTS

| | | | |
|---|---|---|---|
| 5,296,318 | 3/1994 | Gozdz et al. | 429/192 |
| 5,541,019 | * 7/1996 | Anani et al. | 429/59 |
| 5,603,982 | 2/1997 | Sun | 427/121 |
| 5,665,265 | * 9/1997 | Gies et al. | 252/62.2 |

FOREIGN PATENT DOCUMENTS

| | | |
|---|---|---|
| 7-220761 | 8/1995 | (JP) . |
| 9-22724 | 1/1997 | (JP) . |

OTHER PUBLICATIONS

K.M. Abraham et al., "Polymer Electrolytes Reinforced by Celgard Membranes", J. Electrochem. Sci., vol. 142, No. 3, pp. 683–687, Mar. 1995.

* cited by examiner

Primary Examiner—Laura Weiner
(74) Attorney, Agent, or Firm—Rader, Fishman & Grauer

(57) ABSTRACT

A high-strength, heat-resistant and high-safety electrolytic-solution-supporting polymer film which can be applied to secondary batteries typified by lithium and lithium ion secondary batteries and which has an ionic conductivity of at least $5 \times 10^{-4}$ S/cm at 25° C., a puncture strength of at least 300 g and a mechanical heat resistance of at least 300° C.

22 Claims, No Drawings

ELECTROLYTIC-SOLUTION-SUPPORTING POLYMER FILM AND SECONDARY BATTERY

FIELD OF THE INVENTION

The present invention relates to an electrolytic-solution-supporting polymer film having high strength and heat resistance feasible for use in lithium and lithium ion secondary batteries and having excellent safety during overcharging, a so-called gel electrolyte film, and a secondary battery comprising the same.

PRIOR ART OF THE INVENTION

With developments in electronic machines and equipment in recent years, it is desired to develop a secondary battery which is decreased in size and weight and has a high energy density and which is rechargeable an increased number of times. As a battery of this type, attention is drawn to lithium and lithium ion batteries using not an aqueous electrolytic solution but an organic electrolytic solution (non-aqueous electrolytic solution).

In a solution type lithium secondary battery using lithium and a lithium alloy as a negative electrode, a filate lithium crystal (dendrite) is formed when recharging and discharging are repeated, which causes a short circuit, etc., and it is therefore desired to develop a solid electrolyte film which prevents the above phenomenon and has properties as a separator.

Further, in a lithium ion secondary battery which has been commercialized by overcoming the dendrite problem of the lithium ion secondary battery, the separator used for the prevention of an electrode short circuit has no sufficient capacity of holding an electrolytic solution and is liable to cause the leakage of an electrolytic solution, so that it is inevitable to use a metal container for sheathing. The sheathing creates a situation in which not only an additional cost is required, but also it is difficult to fully decrease the battery weight. Under the circumstance, it is desired to develop a high-safety electrolyte film having the function as a separator as well, with a view to overcoming the electrolytic solution leakage and decreasing the weight of the lithium ion secondary battery.

Under the circumstances, studies are being energetically made for an electrolytic film system which attains both a high ionic conductivity and high safety. One of the approaches to the above object is found in an attempt to produce a solid electrolyte of a polymer and an electrolyte alone without incorporating a liquid component (solvent or plasticizer) into a polymer, a so-called intrinsic polymer electrolyte. Since the electrolyte of this type contains no liquid component, an electrolyte film having a relatively high strength can be obtained. However, the limit of its ionic conductivity is as low as approximately $10^{-5}$ S/cm, and it is difficult to attain its sufficient junction to an electrode active substance. For these reasons, the above electrolyte has not yet been materialized for practical use although it has been long studied.

On the other hand, a so-called gel electrolyte produced by adding a liquid component (solvent or plasticizer) to an intrinsic polymer electrolyte has been and is energetically studied as a system which is to overcome the low ionic conductivity and the insufficient interfacial junction of the above intrinsic polymer. In this system, the ionic conductivity of the gel electrolyte film depends upon the content of the contained liquid component, and some systems have come to be reported to exhibit an ionic conductivity of $10^{-3}$ S/cm or more which is considered sufficient for practical use. However, most of these systems show a sharp decrease in mechanical properties due to the addition of the liquid component, and the safety function as a separator, which a solid electrolyte is to have inherently, is no longer obtained.

Under the circumstances, U.S. Pat. No. 5,296,318 discloses a system which is described to satisfy both the strength of a gel electrolyte film and an ionic conductivity. The rechargeable battery comprises a gel electrolyte film containing, as a polymer, a copolymer from vinylidene fluoride and hexafluoropropylene and attracts attention as a system which exhibits specially noted mechanical properties as a gel electrolyte film. However, even this system has a puncture strength one-digit lower than that of a generally used separator, which puncture strength is one index for functions of a separator for a secondary battery, and the gel electrolyte film thereof has a mechanical heat resistance temperature (melt flow temperature) of 100° C. or a little higher, which is lower than that of a polyolefin-based separator by approximately 50° C. At present, therefore, the above system is not necessarily satisfactory for securing the safety of a lithium ion secondary battery.

Under the circumstances, there have been proposed various gel electrolyte films which use a support as a reinforcing material in combination for covering the mechanical properties which are said to be insufficient for a gel electrolyte film. For example, JP-A-9-22724 discloses a method of using a polyolefin-based synthetic non-woven fabric as a support for producing a coated polymer gel electrolyte film. A coarse non-woven fabric is required for impregnating it with a high-viscosity polymer solution and for attaining a high ionic conductivity. When a polyolefin-based non-woven fabric is used, however, the polyolefin fiber itself has no sufficient strength, and it is difficult to decrease the film thickness. Further, since the mechanical heat resistance of the obtained electrolyte film depends upon the polyolefin non-woven fabric, it is approximately 160° C. at the highest.

Further, U.S. Pat. No. 5,603,982 discloses a method of producing a thin film solid polymer electrolyte, in which a non-woven fabric of a polyolefin, etc., having a high gas permeability is impregnated with an electrolyte and a polymerizable monomer in a solution state and then the monomer is polymerized to form a solid electrolyte. In this method, the non-woven fabric can be easily impregnated with the solution since the solution has a low viscosity. Since, however, the non-woven fabric has no sufficient capacity to hold the solution, it is required to sandwich the non-woven fabric with flat substrates to allow the non-woven fabric to hold the solution when a film is formed, and it is required to polymerize the monomer in the above state. In this method, not only the production step is complicated, but also the film is insufficient in mechanical strength due to the use of a polyolefin-based non-woven fabric, and it is difficult to form a thin film.

As a system which can be more easily formed as a thin film than the system using a non-woven fabric, there have been proposed some systems using not the polyolefin-based non-woven fabric but a polyolefin-based finely porous film as a support. Unlike the above non-woven fabric, however, it is difficult to impregnate a finely porous film having a submicron or smaller pore size with a high-viscosity dope, and in a present situation, it is not possible to employ a method of coating a polymer solution, which method is considered easy as an industrial step to take. For overcoming this problem, JP-A-7-220761 discloses a method of impregnating a finely porous polyolefin film of a polyolefin with a low-viscosity solution containing an electrolytic solution and an ultraviolet-curable resin and irradiating the resin with ultraviolet light to cure the resin. However, even if a low-viscosity solution suitable for the impregnation is used, it is difficult to impregnate a hydrophobic finely porous film of a polyolefin with the solution. Not only the finely porous film needs to be treated for imparting hydrophilic nature, but also it is required to sandwich the film with glass plates treated with a fluorine resin when the resin is cured, so that its production steps are complicated. It is also pointed out that the above finely porous film impregnated with a gel electrolyte cannot show any sufficient conductivity (Abraham, et al. J. Electrochem. Soc., 142, No. 3, 1995).

As described above, various attempts have been made to develop an electrolyte-supporting polymer film which can satisfy both a high ionic conductivity and the safety function of a separator. However, there has not been developed any electrolytic-solution-supporting polymer film which exhibits an ionic conductivity sufficiently high for practical use and exhibits sufficient mechanical properties as a separator, which has higher heat resistance than any existing polyolefin-based separator and can be formed as a thin film and which is excellent in safety and practical.

SUMMARY OF THE INVENTION

Under the circumstances, the present inventor has made diligent studies and has developed an excellently safe electrolytic-solution-supporting polymer film which has a practically high ionic conductivity, a short circuit prevention strength as a separator and high heat resistance for the prevention of a short circuit, and a secondary battery using the same. As a result, the present invention has been accordingly completed.

It is an object of the present invention to provide an electrolytic-solution-supporting polymer film, a so-called gel electrolyte film, for a lithium ion secondary battery, which has all of an ionic conductivity, strength and heat resistance and which is highly safe in overcharging, a secondary battery for which the film is adapted, and a process for producing the secondary battery.

According to the present invention, the above object of the present invention is achieved by an electrolytic-solution-supporting polymer film comprising a porous reinforcing material (A) which is formed of a high-strength heat-resistant resin and has a thickness of 100 μm or less, a polar organic polymer compound (B) held in said porous reinforcing material and an electrolytic solution (C) which comprises a polar organic solvent (c1) and an electrolyte (c2) and which is integrated with said polar organic polymer compound and is in a gelled state, the electrolytic-solution-supporting polymer film having a thickness of 200 μm or less, an ionic conductivity of at least $5 \times 10^{-4}$ S/cm, a puncture strength of at least 150 g and a mechanical heat resistance of at least 300° C.

According to the present invention, further, the above object of the present invention is achieved by a secondary battery for which the above electrolytic-solution-supporting polymer film is adapted.

DETAILED DESCRIPTION OF THE INVENTION

The electrolytic-solution-supporting polymer film and the secondary battery of the present invention will be explained hereinafter.

The electrolytic-solution-supporting polymer film of the present invention is an electrolytic-solution-supporting polymer film comprising a porous reinforcing material (A) which is formed of a high-strength heat-resistant resin and has a thickness of 100 μm or less, a polar organic polymer compound (B) held in said porous reinforcing material and an electrolytic solution (C) which comprises a polar organic solvent (c1) and an electrolyte (c2) and which is integrated with said polar organic polymer compound and is in a gelled state, the electrolytic-solution-supporting polymer film having a thickness of 200 μm or less, an ionic conductivity of at least $5 \times 10^{-4}$ S/cm, a puncture strength of at least 150 g and a mechanical heat resistance of at least 300° C.

The ionic conductivity as used herein refers to a value obtained by sandwiching a solid electrolytic-solution-supporting polymer film with 20 mmϕ SUS electrodes, analyzing dependency of an impedance on frequency in a range of from 1 mHz to 65 KHz according to an AC impedance method and determining the same on an impedance value at 10 KHz. When the above value is greater than $5 \times 10^{-4}$ S/cm, the impedance of a battery into which the solid electrolytic-solution-supporting polymer film is incorporated is not high, and the capacity in recharging and discharging at a high rate does not decrease.

In the electrolytic-solution-supporting polymer film of the present invention, characteristically, the puncture strength is at least 150 g, preferably 300 g or more. The puncture strength is a physical property value used for evaluation of a separator as an index for the short circuit prevention strength of separators of existing solution type lithium ion secondary battery. The puncture strength as used in the present specification refers to a value obtained by measurement under the following conditions.

An electrolytic-solution-supporting polymer film is set in a 11.3 mmϕ fixing frame, a needle having an end portion radius of 0.5 mm is perpendicularly stuck in the center of the film and pushed down at a constant rate of 50 mm/minute, and a force which is being exerted on the needle when a through hole is made in the film is taken as a puncture strength.

When the above value is at least 150 g, preferably at least 300 g, the puncture strength of the polymer electrolyte film is sufficient, and when a battery is assembled, desirably, not only the probable occurrence of a short circuit between electrodes is prevented, but also the safety (short circuit prevention) of the assembled battery is sufficiently secured.

Further, the electrolytic-solution-supporting polymer film of the present invention has a characteristic feature in that it has a mechanical heat resistance temperature of 300° C. or higher. The mechanical heat resistance temperature as used herein refers to a value obtained by measurement under the following conditions.

A load of 1 g was applied to a rectangularly shaped electrolytic-solution-supporting polymer film having a thickness of approximately 45 μm, a width of 5 mm and a length of 25 mm, the electrolytic-solution-supporting polymer film is temperature-increased at a rate of 10° C./minute to carry out thermo-mechanical analysis (TMA), and a temperature at which the film is broken or elongated by 10% is taken as a mechanical heat resistance temperature.

When the above temperature is 300° C. or higher, the short circuit between electrodes can be fully prevented when the temperature inside the battery sharply increases, which is preferred in respect of safety.

The electrolytic-solution-supporting polymer film of the present invention is a composite film formed by combining a porous reinforcing thin film having features in strength and heat resistance and an electrolytic-solution-supporting polymer having a sufficient ionic conductivity. The content of the electrolytic-solution-supporting polymer in the electrolytic-solution-supporting polymer film is preferably in the range of from 30 to 85% by weight. When the above content of the electrolytic-solution-supporting polymer is at least 30%) by weight, the porous reinforcing material has almost no serious influence on the conductivity, and the composite electrolytic-solution-supporting polymer film can give a sufficient ionic conductivity. When the above content is too large, undesirably, the strength of the composite electrolytic-solution-supporting polymer film decreases or the thickness of the composite polymer film is uselessly large.

In the electrolytic-solution-supporting polymer film of the present invention, importantly, the porous reinforcing material is completely included inside the film and the film surface is covered with the electrolytic-solution-supporting polymer in a gel state. If the composite film surface is not completely covered with the electrolytic-solution-supporting polymer in a gel state so that there is a portion where the porous reinforcing material is exposed, it is difficult to accomplish a good interfacial junction between a positive electrode and a negative electrode when the battery is formed. Therefore, the ratio (a/b) of the electrolytic-solution-supporting polymer film thickness (a) and the porous reinforcing material thickness (b) is generally 1 to 3, preferably 1.05 to 2.0. When the thickness of the electrolytic-solution-supporting polymer film is smaller than the thickness of the porous reinforcing material, the porous reinforcing material is exposed in some part, and it is difficult to offset the surface unevenness of each of a positive electrode and a negative electrode with the gel-state electrolytic-solution-supporting polymer covering the electrolytic-solution-supporting polymer film, which results in a difficulty in accomplishing the good junction. When the thickness of the electrolytic-solution-supporting polymer film is excessively larger than the thickness of the porous reinforcing material, the volume energy density of the battery is decreased.

Another feature of the electrolytic-solution-supporting polymer film of the present invention is that it has a high capacity of holding an electrolytic solution (intensely holding capacity). Specifically, when the total holding capacity for an electrolytic solution is at least 80 phr, preferably 100 phr, the electrolytic-solution-supporting polymer film shows an intensely holding capacity which is at least 50%, preferably at least 60%), based on the total holding capacity. The holding capacity as used herein refers to an amount of an electrolytic solution based on the total amount of the porous reinforcing material (A) and the polar organic polymer compound (B).

The "total holding capacity" and the "intensely holding capacity" can be also evaluated by centrifugally treating a film supporting an electrolytic solution and treating it with ethanol. Specifically, an electrolytic-solution-supporting polymer film is centrifugally treated at a centrifugal force of 1,400×g (acceleration of gravity) for 20 minutes to remove an electrolytic solution physically held in pores, whereby the amount of the electrolytic solution intensely held in the film can be determined. In the present invention, the amount of the electrolytic solution which still remains after the above centrifugal treatment is defined to be an intensely holding capacity. Further, the amount of the electrolytic solution held before the centrifugal treatment refers to the total holding capacity.

In the electrolytic-solution-supporting polymer film which is centrifugally treated as described above, an intensely held electrolytic solution remains. This intensely held electrolytic solution serves to swell the polar organic polymer compound (B), e.g., a fluorine resin, apparently. The actual capacity of holding the electrolyte can be determined as follows. The above centrifugally treated electrolytic-solution-supporting polymer film is washed with ethanol to remove the electrolytic solution by extraction, and the ethanol is vacuum-dried to determine a weight of the polar organic polymer compound (B) itself including the reinforcing material (A). A weight difference caused by the treatment with ethanol shows an intensely holding capacity, and a weight difference from an initial weight shows a total electrolytic solution holding capacity. The electrolytic-solution-supporting polymer film of the present invention has a total electrolytic solution holding capacity of at least 80 phr, preferably 100 phr, and has an intensely holding capacity of at least 50% preferably 60%.

The base for the unit phr of the above total holding capacity and the above intensely holding capacity is a weight of the polar organic polymer compound (B) itself including the reinforcing material (A) after the above treatment with ethanol is carried out.

Specifically, the "total holding capacity" and the "intensely holding capacity" were determined by carrying out the centrifugal treatment of a composite film (an electrolytic-solution-supporting film) as follows.

A composite film holding an electrolytic solution was punched out to prepare a 3 cmφ test sample, the test sample was sandwiched between two sheets of wire gauze made of stainless steel, and the resultant set was set in a centrifugal rotor having a diameter of 14.5 cm and subjected to centrifugal treatment at a revolution rate of 3,000 rpm for 20 minutes. The treated composite film was measured for a weight, fully washed with ethanol having a weight 1,000 times as large as the treated composite film weight, to extract electrolytic solution held in the composite film, and then, the composite film was dried at 1 mmHg and measured for a weight. the "total holding capacity (phr)" and the "intensely holding capacity (phr)" were determined on the basis of weight differences found in the above procedures.

The present invention also has a characteristic feature not only in that the total holding capacity for an electrolytic solution is high but also in that the intensely holding capacity is high. The intensely holding capacity is at least 50% preferably at least 60%, of the total holding capacity, a battery for which the electrolytic-solution-supporting polymer film is adapted is free of leakage caused by poor electrolyte holding capacity.

The high-strength heat-resistant resin for forming the porous reinforcing material (A) of the electrolytic-solution-supporting polymer film of the present invention includes organic polymer compounds having a Young's modulus of at least 100 kg/mm$^2$, preferably at least 300 kg/mm$^2$ and a heat resistance of at least 200° C., preferably at least 300° C., which organic polymer compounds are typified by an aromatic polyamide polymer, a so-called aramid resin. An aromatic polyamide polymer can be used in the present invention regardless of its meta- or para-molecular structure. A meta-aromatic polyamide polymer is typified by a wholly aromatic polyamide having a main constituting unit formed from m-phenyleneisophthalamide, and a para-aromatic polyamide polymer is typified by a wholly aromatic polyamide having a main constituting unit formed from p-phenyleneterephthalamide. A mixture of these may be used.

The porous reinforcing material in the present invention is preferably a high-strength high-gas-permeability thin film having an average film thickness of 100 μm or less, preferably 50 μm or less, a puncture strength of at least 100 g, preferably at least 200 g, and a gas permeability of 20 sec/100 cc·in$^2$ or less, preferably 10 sec/100 cc·in$^2$ or less. When the average film thickness exceeds 100 μm, a high-strength support can be obtained, but an obtained composite film has a large thickness and the volume energy density is decreased when it is used for assembling a battery.

The puncture strength of the porous reinforcing material used in the present invention is preferably at least 100 g. When a support having a puncture strength of less than 100 g is used, it is difficult to accomplish the puncture strength of 150 g or more even after the composite film is formed by impregnating it with the electrolytic-solution-supporting polymer, so that the safety (short circuit prevention) of an assembled battery is decreased.

The gas permeability of the porous reinforcing material, as used in the present invention, refers to a value obtained by measurement according a Gurley method (a time period for which 100 cc air permeates an area of 1 in$^2$ under a pressure of 2.3 cmHg). As the porous reinforcing material thin film in the present invention, it is preferred to use a support having the above gas permeability of 20 sec/100 cc·in$^2$ or less, preferably 10 sec/100 cc·in$^2$ or less. When a support having the above value of greater than 20 sec/100 cc·in$^2$ or having a low gas permeability, it is difficult to carry out the formation of a composite film by impregnation with the electrolytic-solution-supporting polymer by a polymer solution coating method which is considered the most industrially advantageous, and further, it is difficult to fully increase the ionic conductivity of the electrolytic-solution-supporting polymer film.

The form of the porous reinforcing material satisfying the above properties includes a non-woven fabric formed of a fiber of the above polymer, a woven fabric of said fiber, a gas-permeable paper-like sheet of said fiber in which synthesis pulp of said polymer is dispersed in gaps of said fiber, and a gas-permeable film of the above resin having numerous open pores. Any one of these forms can be used in the present invention so long as the above-described properties required of the support are satisfied, while a sheet in the form of a non-woven fabric is the most preferred in view of the gas permeability. The basis weight thereof per unit area is preferably in the range of from 8 to 35 g/m$^2$, more preferably 12 to 30 g/m$^2$. When the above basis weight per unit area is less than 8 g/m$^2$, a support having a high gas permeability is easily obtained, but it is difficult to obtain a support having a puncture strength of at least 100 g, which results in a difficulty in obtaining a solid electrolytic-solution-supporting polymer film having excellent short circuit prevention properties. When the above basis weight per unit area exceeds 35 g/m$^2$, the requirement of the puncture strength is easily satisfied, but it is difficult to form a porous support having an average film thickness of 100 μm or less. Further, when a thinner support is formed by excessively increasing a density, the gas permeability decreases or a MacMullin number increases, which results in a difficulty in obtaining an electrolytic-solution-supporting polymer film having a high ionic conductivity.

The above porous reinforcing material (A) has a thickness of 100 μm or less, preferably 50 μm or less, more preferably 40 μm or less, has a puncture strength of at least 100 g, preferably at least 200 g, and has a gas permeability of 20 sec/100 cc·in$^2$ or less, preferably 10 sec/100 cc·in$^2$ or less, and it is a thin film internally having a there-dimensional network. It is sufficient that the three-dimensional network should be present in the formed electrolytic-solution-supporting polymer film, and it is not necessarily required to from the three-dimensional network thin film from the beginning. Preferably, however, the porous reinforcing material (A) is a three-dimensional network thin film which is present as such from the beginning, such as a non-woven fabric, a woven fabric, or a paper. These materials preferably have a non-woven-fabric-like sheet structure whose basis weight per unit area is in the range of from 8 to 35 g/m$^2$. Further, the porous reinforcing material (A) is not required to be derived from a fiber, and for example, it can be a porous film-like thin film having a MacMullin number of 5 or less.

The electrolytic-solution-supporting polymer used for forming a composite film impregnation or the porous reinforcing material with it in the present invention will be explained below. The electrolytic-solution-supporting polymer for use in the present invention is selected from electrolytic-solution-supporting polymers having conductivity for metal ion derived from an electrolyte, typified by lithium ion, and having an ionic conductivity of at least $5 \times 10^{-4}$ S/cm at 25° C. When an electrolytic-solution-supporting polymer has an ionic conductivity lower than the above value, it is difficult to secure a practically sufficient ionic conductivity of at least $5 \times 10^{-4}$ S/cm when a composite film is formed by impregnating the porous reinforcing material with the electrolytic-solution-supporting polymer.

As an electrolytic-solution-supporting polymer, any one of an intrinsic polymer electrolyte containing no liquid component and a gelled electrolyte containing a liquid component may be used, while a gelled electrolyte is suitably used in view of an ionic conductivity. The polymer resin for the electrolytic-solution-supporting polymer for use in the present invention includes polar organic polymer compounds which undergo gelation when they are impregnated with a polar electrolytic solution. Examples of the polymer resin include polyalkylene oxides such as polyethylene oxide (PEO) and a copolymer of PEO and polypropylene oxide (PPO), acrylic resins such as polyacrylonitrile (PAN), polymethyl methacrylate (PMMA), a copolymer of PAN and PMMA and a copolymer (NSR) of acrylonitrile and styrene, halogenated resins such as polyvinyl chloride (PVC) and a copolymer of polyvinylidene fluoride (PVdF), and polysaccharide polymers such as pullulan and a methacrylate-containing polymer or copolymer having an ethylene oxide structure, although the polymer resin shall not be limited to these. In view of easiness in a film-forming step, it is preferred to use a polymer which can be directly applied to an aramid porous reinforcing material while it is in a flowable (solution) state, to impregnate the porous reinforcing material with the polymer.

As a polar organic polymer compound for a gelled electrolyte, particularly preferred is a polyvinylidene fluoride-based compound containing, as a main component, polyvinylidene fluoride (PVdF) which easily permits impregnation by application and has excellent oxidation resistance, such as a PVdF copolymer. A comonomer suitable for use in combination includes hexafluoropropylene (HFP), perfluoromethyl vinyl ether (PFMV), chlorotrifluoroethylene (CTFE), vinyl fluoride and tetrafluoroethylene (TFE). A bipolymer or terpolymer from these comonomers and vinylidene fluoride (VdF) is preferred as a polymer material in the present invention. The copolymerization ratio of the molality of VdF is preferably in the range of from 90 to 98 mol %. When the molar percentage of VdF is greater than 98%, undesirably, the crystallinity of the polymer is too high, so that the solubility thereof in various coating solvents decreases, and further, undesirably, the swelling degree thereof to an electrolytic solution decreases. When the above molar percentage of VdF is smaller than 90%, undesirably, the crystallinity of the polymer is too low, so that the mechanical properties of the polymer supporting an electrolytic solution decrease.

As an electrolytic solution used for impregnation of the above polar organic polymer compound for the gelled electrolyte, it is preferred to use a solution of an electrolyte (e.g., lithium salt) in a polar organic solvent (non-aqueous solvent (plasticizer) (to be sometimes referred to as "non-aqueous electrolytic solution" hereinafter). The amount of the electrolytic solution per 100 parts by weight of the polar organic polymer is required to be at least 100 parts by weight. When the amount of the electrolytic solution is less than 100 parts by weight, it is difficult to secure a sufficient ionic conductivity when a composite film is formed by combining the electrolytic-solution-supporting polymer with the porous reinforcing material.

The polar organic solvent is selected from polar organic solvents having 10 or less carbon atoms, generally used for a lithium ion secondary battery. Examples of the polar organic solvent include propylene carbonate (PC), ethylene carbonate (EC), butylene carbonate (BC), dimethyl carbonate (DMC), diethyl carbonate (DEC), methyl ethyl carbonate (MEC), 1,2-dimethoxyethane (DME), 1,2-diethoxyethane (DEE), γ-butyrolactone, (γ-BL), sulfolane and acetonitrile. The above polar organic solvents may be used alone or in combination. It is particularly preferred to use at least one selected from PC, EC, γ-BL, DMC, DEC, MEC or DME.

The electrolyte soluble in the polar organic solvent preferably includes quaternary ammonium salt, alkali metal ions such as lithium salt, sodium salt and potassium salt, and alkaline earth metal salts such as calcium salt and magnesium salt. When it is intended to produce a lithium secondary battery in particular, the lithium salt includes lithium perchlorate ($LiClO_4$), lithium hexafluorophosphate ($LiPF_6$), lithium borotetrafluoride, lithium hexafluoroarsenate ($LiAsF_6$), lithium trifluorosulfonate ($CF_3SO_3Li$), lithium perfluoromethylsulfonylimide [$LiN(CF_3SO_2)_2$] and lithium perfluoroethylsulfonylimide [$LiN(C_2F_5SO_2)_2$], although the lithium salt shall not be limited thereto. Further, the above lithium salts may be used in combination. The lithium salt dissolved in the above polar organic solvent is preferably in the range of from 0.2 to 2 M.

The method for producing the electrolytic-solution-supporting polymer film of the present invention will be explained hereinafter. The electrolytic-solution-supporting polymer film of the present invention can be produced by allowing the high-strength high-gas-permeability porous reinforcing material (A) having an average thickness of 100 μm or less, preferably 50 μm or less, a puncture strength of at least 100 g, preferably at least 200 g and a gas permeability of 20 sec/100 cc·in$^2$ or less, preferably 10 sec/100 cc·in$^2$ or less, to support a gelled electrolyte (i.e., electrolytic-solution-supporting polymer) holding at least 100 parts by weight, per 100 parts by weight of the above polymer (B), of an electrolytic solution which is a solution of an electrolyte (e.g., lithium salt) (c2) in the polar organic solvent (c1) in a state where the porous reinforcing material (A) is impregnated with the gelled electrolyte. The method of forming a composite film by impregnation with the gelled electrolyte is not specially limited, while it is preferred to employ a method of directly coating and impregnating the porous reinforcing material with the polymer in a flowable (solution) state, since the composite film can be industrially easily produced. The above method includes, for example, the following methods.

① A method of forming a composite film, in which the polymer resin (polar organic polymer compound) for a gelled electrolyte and the electrolytic solution (c1+c2) are mixed and dissolved under heat, and the porous reinforcing material is directly coated and impregnated with the resultant dope in a solution state and cooled to solidify.

② A method of forming a composite film, in which the polymer resin for a gelled electrolyte, the electrolytic solution and a volatile solvent which can dissolve the polymer resin are mixed and dissolved, the porous reinforcing material is directly coated and impregnated with the resultant dope in a solution state, and then a volatile solvent is removed by drying.

③ A method of forming a composite film, in which the polymer resin for a gelled electrolyte, a solvent which can dissolve the polymer resin and is compatible with water, and a phase separator (gelling agent or pores-forming agent) are mixed and dissolved, the porous reinforcing material is directly coated and impregnated with the resultant dope in a solution state, the resultant film is immersed in an aqueous coagulation bath to coagulate the polymer, then washed with water and dried, and then the resultant composite film is immersed in an electrolytic solution to allow the polymer resin to undergo gelation.

④ A method of allowing the polymer resin to undergo gelation, in which the polymer resin for a gelled electrolyte and a high-strength heat-resistant resin for reinforcement are mixed and dissolved together with a solvent which can dissolve these two components and is compatible with water and a phase separator, the resultant dope in a solution state is ejected through a slit and immersed in an aqueous coagulation bath to coagulate the resultant film, the film is washed with water and dried, and the resultant blend composite film is immersed in an electrolytic solution to allow the polymer resin to undergo gelation.

The secondary battery of the present invention will be explained hereinafter.

The secondary battery of the present invention is a polymer secondary battery in which a positive electrode having a positive electrode material which holds a non-aqueous electrolytic solution and occludes and releases metal ion (to be typified by lithium ion hereinafter) derived from an electrolyte and a negative electrode having a carbonaceous negative electrode material which holds a non-aqueous electrolytic solution and occludes and releases lithium ion are joined to each other through the electrolytic-solution-supporting polymer film, and the secondary battery of the present invention has a characteristic feature in that the electrolytic-solution-supporting polymer film has an ionic conductivity of at least $5 \times 10^{-4}$ S/cm at 25° C., a puncture strength of at least 150 g and a mechanical heat resistance of at least 300° C. Above all, the secondary battery of the present invention has its characteristic features in that the electrolytic-solution-supporting polymer film is an electrolytic-solution-supporting polymer film comprising a porous reinforcing material (A) which is formed of a high-strength heat-resistant resin and has a thickness of 100 μm or less, a polar organic polymer compound (B) held in said porous reinforcing material and an electrolytic solution (C) which comprises a polar organic solvent (c1) and an electrolyte (c2) and which is integrated with said polar organic polymer compound and is in a gelled state, the electrolytic-solution-supporting polymer film having a thickness of 200 μm or less, an ionic conductivity of at least $5 \times 10^{-4}$ S/cm, a puncture strength of at least 150 g and a mechanical heat resistance of at least 300° C. The porous reinforcing material (A), the polar organic polymer compound (B) and the electrolytic solution (C) are preferably selected from those which are explained already.

Each component of the secondary battery will be explained below.

(Positive electrode)

The positive electrode in the present invention can be composed of an active substance which occludes and releases ion typified by lithium ion, a non-aqueous electrolytic solution, a binder polymer which holds the electrolytic solution and binds the active substance, and a current collecting material.

The above active substance includes various lithium-containing oxides and chalcogen compounds. The lithium-containing oxides include lithium-containing cobalt oxides such as $LiCoO_2$, lithium-containing nickel oxides such as $LiNiO_2$, lithium-containing manganese composite oxides such as $LiMn_2O_4$, and a lithium-containing amorphous vanadium pentoxide. The chalcogen compounds include titanium disulfide and molybdenum disulfide.

The non-aqueous electrolytic solution can be selected from those which are already explained with regard to the electrolytic-solution-supporting polymer film.

The binder polymer for holding the non-aqueous electrolytic solution and binds the active substance includes polyvinylidene fluoride (PVdF), PVdF copolymer resins such as a copolymer of PVdF and hexafluoropropylene (HFP), perfluoromethyl vinyl ether (PFMV) or tetrafluoroethylene, fluorine-containing resins such as polytetrafluoroethylene and a fluorine rubber, hydrocarbon polymers such as a styrene-butadiene copolymer, a styrene-acrylonitrile copolymer and an ethylene-propylene terpolymer, carboxymethyl cellulose and a polyimide resin, although the binder polymer shall not be limited to these. The above binder polymers may be used alone or in combination.

The amount of the binder polymer per 100 parts by weight of the active substance is preferably in the range of from 3 to 30 parts by weight. When the amount of the binder polymer is less than 3 parts by weight, undesirably, no sufficient binding strength can be obtained for binding the active substance. When the above amount exceeds 30 parts by weight, undesirably, the active substance density in the positive electrode is low, and as a result, the energy density of the battery is decreased.

The current collecting material is preferably selected from materials excellent in oxidation stability. Specific examples thereof include aluminum, stainless steel, nickel and carbon. Aluminum in the form of a foil is particularly preferred.

The positive electrode in the present invention may contain a synthetic graphite, carbon black (acetylene black) or a nickel powder as an electrically conductive auxiliary.

Although not specially limited, the method of producing the positive electrode in the present invention can be selected from the following methods.

① A method in which predetermined amounts of the active substance, the binder polymer and a volatile solvent capable of dissolving the binder are mixed and dissolved, to prepare an active substance paste, the paste is coated on a current collecting material, the resultant coating is dried to remove the volatile solvent, and the resultant coating is immersed in a non-aqueous electrolytic solution to allow the coating to hold the electrolytic solution.

② A method in which predetermined amounts of the active substance, the binder polymer and a water-soluble solvent capable of dissolving the binder are mixed and dissolved, to prepare an active substance paste, the paste is coated on a current collecting material, the resultant coating is immersed in an aqueous coagulation bath to coagulate the binder polymer, the coating is washed with water and dried, and the coating is immersed in a non-aqueous electrolytic solution to allow the coating to hold the electrolytic solution.

③ A method in which predetermined amounts of the active substance, the binder polymer, a low-boiling point volatile solvent capable of dissolving the binder and a non-aqueous electrolytic solution are mixed and dissolved, to prepare an active substance paste, the paste is coated on a current collecting material, and then the resultant coating is dried to remove the low-boiling point solvent alone, whereby a film of a positive electrode holding the electrolytic solution is directly formed.

(Negative electrode)

The negative electrode in the present invention will be explained below. Typically, the negative electrode in the present invention can be composed of a carbonaceous active substance which occludes and releases ion typified by lithium ion, a non-aqueous electrolytic solution, a binder polymer which holds the electrolytic solution and binds the active substance and a current collecting material.

The above carbonaceous active substance includes a product obtained by sintering an organic polymer compound such as polyacrylonitrile, a phenolic resin, a phenol novolak resin or cellulose, a product obtained by sintering coke or pitch, and carbonaceous materials typified by a synthetic graphite and natural graphite.

The non-aqueous electrolytic solution can be selected from those explained with regard to the above electrolytic-solution-supporting polymer film.

The binder polymer which holds the non-aqueous electrolytic solution and binds the active substance can be selected from those explained with regard to the above positive electrode.

The amount of the binder polymer per 100 parts by weight of the active substance is preferably in the range of from 3 to 30 parts by weight. When the amount of the binder polymer is less than 3 parts by weight, undesirably, no sufficient binding strength can be obtained for binding the active substance. When the above amount exceeds 30 parts by weight, undesirably, the active substance density in the negative electrode decreases, which results in a decrease in the energy density of the battery.

The current collecting material is preferably selected from materials excellent in reduction stability. Specific examples thereof include metal copper, stainless steel, nickel and carbon. Metal copper in the form of a foil is particularly preferred.

Further, the negative electrode in the present invention may contain a synthetic graphite, carbon black (acetylene black) or a nickel powder as an electrically conductive auxiliary.

Although not specially limited, the method of producing the negative electrode in the present invention can be selected from those methods explained with regard to the above positive electrode.

(Preparation of battery)

The process for producing the polymer electrolyte secondary battery of the present invention will be explained below. The production process of the present invention has a characteristic feature in that a battery element can be constituted without a post-process of impregnation with a non-aqueous electrolytic solution, by stacking the positive electrode allowed to hold the non-aqueous electrolytic solution, the composite electrolytic-solution-supporting polymer film and the negative electrode allowed to hold the non-aqueous electrolytic solution and laminating them according to thermal press-bonding method. Further, the production process of the present invention has also another feature in that the temperature for the thermal press-bonding can be decreased due to a melting point drop by carrying out the thermal press-bonding using the composite electrolytic-solution-supporting polymer film in a state where the polymer film supports the non-aqueous electrolytic solution and that the electrolytic-solution-supporting polymer film is not collapsed together during the thermal press-bonding since the electrolytic-solution-supporting polymer film is a composite film having the heat-resistant high-strength support.

The thermal press-bonding method is not specially limited, since various procedures can be employed. For example, there may be employed a method using a hot roller such as a double roll laminator. The temperature for the thermal press-bonding is set at a temperature in the range of from room temperature to 150° C. When the press-bonding temperature is lower than room temperature, bonding of electrodes and the composite electrolytic-solution-supporting polymer film is not sufficient. When the press-bonding temperature is higher than 150° C., decomposition of the electrolyte under heat or a decomposition reaction between the negative electrode material and the electrolytic solution is liable to take place together. The press-binding temperature is preferably in the range of from 30° C. to 120° C.

The polymer electrolyte secondary battery of the present invention further has a characteristic feature in that the positive electrode and the composite electrolytic-solution-supporting polymer film are bonded to each other, and the negative electrode and the composite electrolytic-solution-supporting polymer film are bonded to each other, at a peel strength of at least 10 gf/cm each, so that excellent interfacial bonding is accomplished. The peel strength as used herein refers to a value obtained by measurement under the following conditions.

A positive electrode or a negative electrode and a composite electrolytic-solution-supporting polymer film bonded to each other are cut to prepare a rectangular test piece having a width of 3 cm and a length of 6 cm, and the electrode and the composite electrolytic-solution-supporting polymer film of the test piece are peeled from each other at a rate of 10 cm/minute according to a 180° peel test method. In this case, an average peel strength (gf/cm) per unit width is taken as a peel strength.

When the above value is less than 10 gf/cm, the interfacial bonding between the electrode and the electrolytic-solution-supporting polymer film is insufficient, an increase in an interfacial impedance is liable to be caused, or interfacial separation is liable to take place due to handling during the production of a battery or recharging and discharging which are repeated.

As will be understood from the above explanations, the secondary battery of the present invention is particularly preferably a secondary battery in which the positive electrode and the electrolytic-solution-supporting polymer film are bonded to each other, and the negative electrode and the electrolytic-solution-supporting polymer film are bonded to each other, at a peel strength of at least 10 gf/cm each.

Above all, preferred is a polymer electrolyte secondary battery in which the content of the gelled electrolytic-solution-supporting polymer in the electrolyte-supporting polymer film is 30 to 85% by weight and the average film thickness of the electrolytic-solution-supporting polymer film is 1.05 to 2.0 times the average film thickness of the porous reinforcing material (A), since the above polymer electrolyte secondary battery has high safety when overcharged.

The above secondary battery of the present invention can be produced by various methods as explained above, while it is particularly preferred to employ a method in which the positive electrode holding the non-aqueous electrolytic solution, the electrolyte-supporting polymer film holding the non-aqueous electrolytic solution and the negative electrode holding the non-aqueous electrolytic solution are stacked in this order, and the resultant set is laminated by the thermal press-bonding method.

EXAMPLES

The present invention will be explained more in detail with reference to Examples.

Example 1

<Porous Reinforcing Material Made of Aramid>

Noncrsytalline m-aramid continuous filaments having a size of 3 denier as a binder were added to crystallized m-aramid short filaments having a size of 1.25 denier, and a film having a basis weight of 19 g/m$^2$ was formed therefrom by a dry paper making method and subjected to a calender roll to give a non-woven fabric sheet. The so-obtained support had the following properties; an average thickness of 36 μm, a density of 0.53 g/cm$^3$, a porosity of 62%, a gas permeability of 0.04 sec/100 cc·in$^2$ a puncture strength of 330 g and a MacMullin number of 2.4.

<Formation of Composite Film by Combining Gelled Electrolyte>

As a polymer resin (polar organic polymer compound) for a gelled electrolyte, a PVdF copolymer obtained by copolymerizing PVdF and 5 mol %, based on PVdF, of hexafluoropropylene (HFP) was used. To 100 parts by weight of the above polymer was added 300 parts by weight of an electrolytic solution of 1 M of LiBF$_4$ in PC/EC (1/1 (weight ratio)), and further, tetrahydrofuran (THF) as a solvent was added. The above polymer was dissolved therein, to give a dope having a polymer concentration of 12% by weight. The above porous reinforcing material made of aramid was coated and impregnated with the dope, and THF was dried off at 50° C. to give an electrolytic-solution-supporting polymer film. The film had a total holding capacity of 108 phr of the electrolytic solution and an intensely holding capacity of 78 phr of the electrolytic solution.

Comparative Example 1

The same dope for a gelled electrolyte as that used in Example 1 was coated on a silicone-coated release film without using the porous reinforcing material made of aramid, to obtain a non-composited film formed of the gelled electrolyte.

Comparative Example 2

A film was formed in the same manner as in Comparative Example 1 except that 100 parts by weight of the electrolytic solution was added to 100 parts by weight of the polymer resin for a gelled electrolyte, whereby a non-composited film formed of the gelled electrolyte was obtained.

Comparative Example 3

A composite electrolytic-solution-supporting polymer film combined with the same porous reinforcing material made of aramid as that used in Example 1 was formed in the same manner as in Example 1 except that the amount of the electrolytic solution per 100 parts by weight of the polymer resin for a gelled electrolyte was changed to 80 parts by weight.

Comparative Example 4

A porous reinforcing material made of aramid was prepared by a dry paper making method in the same manner as in Example 1 except that the basis weight of the porous reinforcing material made of aramid was changed to 7 g/m$^2$. The obtained support had the following properties; an average thickness of 20 μm, a density of 0.51 g/cm$^3$, a porosity of 63%, a gas permeability of 0.01 sec/100 cc·in$^2$, a puncture strength of 85 g and a MacMullin number of 1.6. The above support was used, and a composite film combined with the same gelled electrolyte as that in Example 1 was prepared in the same manner as in Example 1.

Example 2

A composite electrolytic-solution-supporting polymer film combined with a porous reinforcing material made of aramid was prepared in the same manner as in Example 1 except that the polymer resin for a gelled electrolyte was replaced with a polymer obtained by copolymerizing PVdF and 8.7 mol %, based on PVdF, of HFP and that the amount of the electrolytic solution per 100 parts by weight of the polymer resin was changed to 250 parts by weight. The composite electrolytic-solution-supporting polymer film had a total holding capacity of 93 phr of the electrolytic solution and an intensely holding capacity of 78 phr of the electrolytic solution.

Comparative Example 5

As in Example 2, a non-composited film formed of a gelled electrolyte was obtained in the same manner as in Comparative Example 1, without using a porous reinforcing material made of aramid.

Comparative Example 6

As a porous reinforcing material made of aramid, crystallized m-aramid short filaments having a size of 1.25 denier and m-aramid fibrid (synthetic pulp-shaped particles) were mixed in a mixing ratio of 7/3 (weight ratio), a diluted aqueous slurry was prepared, and the slurry was formed into a wet sheet having a basis weight of 37 g/m$^2$. The obtained wet sheet was subjected to a calender roll to give a papery sheet. The obtained support had the following properties; an average thickness of 58 μm, a density of 0.62 g/cm$^3$, a porosity of 51%, a gas permeability of 29 sec/100 cc·in$^2$, a puncture strength of 630 g and a MacMullin number of 10.0.

An attempt was made to impregnate the above porous reinforcing material made of aramid with the same polymer dope for a gelled electrolyte as that in Example 2, while the impregnation of the porous reinforcing material made of aramid was not fully effected into the interior of the material, so that no good composite electrolyte film was formed.

Example 3

Polyacrylonitrile (PAN) was used as a polymer resin for a gelled electrolyte. 12 Parts by weight of PAN, 55 parts by weight of EC, 27 parts by weight of PC and 8 parts by weight of LIBF$_4$ were readily mixed and dissolved at 120° C. to prepare a coating dope. The same porous reinforcing material made of aramid as that in Example 1 was coated and impregnated with the dope while the dope had a temperature of 120° C., and the doped porous reinforcing material was cooled to room temperature to gel the dope, whereby a composite electrolytic-solution-supporting polymer film combined with the porous reinforcing material made of aramid was obtained. The film had a total holding capacity of 127 phr of the electrolytic solution and an intensely holding capacity of 83 phr thereof.

Comparative Example 7

A non-composited film of a PAN gelled electrolyte alone was formed in the same manner as in Example 3 except that the porous reinforcing material made of aramid was not used.

Example 4

As a polymer resin for a gelled electrolyte, a PVdF copolymer obtained by copolymerizing PVdF and 5.3 mol %, based on PVdF, of perfluoromethyl vinyl ether (PFMV) was used. To 72 parts by weight of the polymer resin were added 262 parts by weight of dimethylacetamide (DMAc) and 66 parts by weight of polyethylene glycol having an average molecular weight of 400, and the mixture was dissolved under heat at 60° C. to prepare a coating dope. The same porous reinforcing material made of aramid as that in Example 1 was coated and impregnated with the above-obtained dope, and the resultant film was immersed in a 50% DMAc aqueous solution to coagulate the film. The resultant film was washed with water and dried to give a dry composite film formed of the porous reinforcing material made of aramid and the PVdF copolymer. The obtained dry composite film was immersed in a solution of 1 M of LiBF$_4$ in PC/EC (1/1 (weight ratio)) to form a composite electrolytic-solution-supporting polymer film impregnated with the electrolytic solution. The film had a total holding capacity of 104 phr of the electrolytic solution and an intensely holding capacity of 70 phr thereof.

Example 5

As a polymer resin for a gelled electrolyte, a PVdF copolymer obtained by copolymerizing PVdF and 9.0 mol %, based on PVdF, of PFMV was provided. Then, a composite electrolytic-solution-supporting polymer film was prepared in the same manner as in Example 4 except that the polymer resin was replaced with the above polymer resin. The film had a total holding capacity of 108 phr of the electrolytic solution and an intensely holding capacity of 75 phr thereof.

The electrolyte films obtained in the above Examples and Comparative Example were measured as explained already in the present specification. Table 1 shows the results.

TABLE 1

| No. | Polymer | Porous reinforcing material | Film thickness ($\mu$m) | Total holding capacity (phr) | Puncture strength (g) | Conductivity (S/cm, 25° C.) | TMA Heat resistance temperature (° C.) |
|---|---|---|---|---|---|---|---|
| Ex. 1 | P (VdF-HFP) 5 mol | present | 45 | 108 | 450 | $1.3 \times 10^{-3}$ | >400 |
| CEx. 1 | " | absent | 45 | 300 | 20 | $2.5 \times 10^{-3}$ | 100 |
| CEx. 2 | " | absent | 45 | 100 | 48 | $4.0 \times 10^{-4}$ | 144 |
| CEx. 3 | " | present | 45 | 47 | 483 | $8.9 \times 10^{-5}$ | >400 |
| CEx. 4 | " | present | 45 | 150 | 128 | $1.9 \times 10^{-3}$ | >400 |
| Ex. 2 | P (VdF-HFP) 8.7 mol | present | 45 | 93 | 424 | $6.8 \times 10^{-4}$ | >400 |
| CEx. 5 | " | absent | 45 | 245 | 21 | $1.8 \times 10^{-3}$ | 55 |
| CEx. 6 | " | present | | | Impregnation not possible | | |
| Ex. 3 | PAN | present | 45 | 127 | 415 | $7.4 \times 10^{-4}$ | >400 |
| CEx. 7 | " | absent | 45 | 730 | 10 | $2.0 \times 10^{-3}$ | 115 |
| Ex. 4 | P (VdF-FMVE) 5.3 mol | present | 45 | 104 | 460 | $1.0 \times 10^{-3}$ | >400 |
| Ex. 5 | P (VdF-FMVE) 9.0 mol | present | 45 | 108 | 438 | $8.8 \times 3\, 10^{-4}$ | >400 |

Ex. = Example, CEx. = Comparative Example

Example 6
[Composite Electrolytic-solution-supporting Polymer Film]
<Aramid Porous Reinforcing Material>

Noncrystalline m-aramid continuous filaments having a size of 3 denier as a binder were added to crystallized m-aramid short filaments having a size of 1.25 denier, and a film having a basis weight of 19 g/m² was formed therefrom by a dry paper making method and subjected to a calender roll to give a non-woven fabric sheet. The so-obtained reinforcing material had the following properties; an average thickness of 36 $\mu$m, a density of 0.53 g/cm³, a porosity of 62%, a gas permeability of 0.04 sec/100 cc·in², a puncture strength of 330 g and a Macmillan number of 2.4.

<Polymer Synthesis>

A pressure reactor made of stainless steel was charged with 2.1 g of perfluoromethyl vinyl ether (PFMV), 30 ml of trichlorotrifluoroethane (CFC113) and 1 ml of a solution of 5% heptafluorobutyl peroxide in CFC 113, and atmosphere in the reactor was replaced with nitrogen. Then, the reactor was cooled to −78° C. to vacuum it. 18.4 Grams of vinylidene fluoride (VdF) was charged into the reactor, and polymerization was carried out by stirring the mixture at room temperature for 20 hours. The resultant reaction product was dissolved in DMSO and analyzed for a copolymer composition ratio by NMR to show a VdF/FMVE=95.7/4.3 molar ratio.

<Formation of Composite Film by Combining Gelled Electrolyte>

As a polymer resin for a gelled electrolyte, a PVdF copolymer obtained by copolymerizing PVdF and 5.3 mol %, based on PVdF, of perfluoromethyl vinyl ether (PFMV) was used. To 100 parts by weight of the above polymer was added 300 parts by weight of an electrolytic solution of 1 M of $LiBF_4$ in PC/EC (1/1 (weight ratio)), and further, tetrahydrofuran (THF) as a solvent was added. The above polymer was dissolved therein, to give a dope having a polymer concentration of 12% by weight. The above aramid porous reinforcing material was coated and impregnated with the dope, and THF was dried off at 50° C. to give a composite electrolytic-solution-supporting polymer film. The film had the following properties; an average thickness of 45 $\mu$m (a 4 to 5 $\mu$m thick polymer electrolyte layer was present on each surface of the composite film), a puncture strength of 443 g, an ionic conductivity of $1.3 \times 10^{-3}$ S/cm (25° C.) and a TMA heat resistance temperature of >400° C.

[Positive Electrode]

A paste of a positive electrode material was prepared from 85 parts by weight of a lithium cobaltate ($LiCoO_2$, supplied by Kansai Syokubai), 5 parts by weight of carbon black and a solution of 12 wt % PVdF in N-methyl pyrrolidone (NMP) which solution was to give polyvinylidene fluoride (PVdF) in a dry weight of 10 parts by weight. The obtained paste was applied onto a 20 $\mu$m thick aluminum foil and dried to give a 120 $\mu$m thick positive electrode coating. The obtained positive electrode was immersed in a solution of 1 M of $LiBF_4$ in PC/EC (1/1 (weight ratio)), to form a positive electrode holding the electrolytic solution.

[Negative Electrode]

A paste of a negative electrode material was prepared from 90 parts by weight of a mesophase carbon microbeads (MCMB, supplied by Osaka Gas Chemical) as a carbonaceous negative electrode material and a solution of 12 wt % PVdF in NMP which solution was to give polyvinylidene fluoride (PVdF) in a dry weight of 10 parts by weight. The obtained paste was applied onto a 18 $\mu$m thick copper foil and dried to give a 125 $\mu$m thick negative electrode coating. The obtained negative electrode was immersed in a solution of 1 M of $LiBF_4$ in PC/EC (1/1 (weight ratio)), to form a negative electrode holding the electrolytic solution.

[Preparation of Battery]

The positive electrode, the negative electrode and the composite electrolytic-solution-supporting polymer film were respectively cut in a size of 3 cm×6 cm each, and the so-prepared positive electrode, composite electrolytic-solution-supporting polymer film and negative electrode were stacked in this order. The resultant set was thermally press-bonded at 80° C. with a double roll laminator. A battery element (positive electrode/composite electrolytic-solution-supporting polymer film/negative electrode laminate) prepared in the same manner as above was subjected to a 180° peel test to show that the positive electrode and the electrolytic-solution-supporting polymer film were bonded to each other at 30 gf/cm and that the negative electrode and the same polymer film were bonded to each other at 22 gf/cm. It was thus seen that excellent interfacial bonding was accomplished. A stainless steel sheet terminal was attached to each current collecting material of the obtained battery element, and a sheet-shaped battery was prepared by laminating a polyethylene/aluminum/polyethylene terephthalate laminated sheet (thickness 50 $\mu$m). The obtained battery was charged and discharged at a current density of 1 mA/cm². In this case, charging was carried out up to 4.2 V, and discharging was cut at 2.7 V. The initial discharging showed a current efficiency of 80%, and repeated charging and discharging were possible. Further, the discharge amount per a negative electrode weight was 200 mAh/g.

Comparative Example 8
[Electrolytic-solution-supporting Polymer Film]

A non-composited film of a gelled electrolyte film alone was formed by applying the same dope for a gelled electrolyte as that in Example 6 on a silicone-coated release film without using the aramid porous reinforcing material. The obtained film had the following properties; a film thickness of 45 μm, a puncture strength of 20 g, an ionic conductivity of $2.5 \times 10^{-3}$ S/cm and a TMA heat resistance temperature of 100° C. As compared with the film obtained in Example 6, the film obtained in this Comparative Example had a good conductivity, while it was poor in puncture strength and heat resistance.

[Preparation of battery]

An attempt was made to prepare a battery element from the same positive electrode and negative electrode as those in Example 6 and the electrolyte-supporting polymer film in this Comparative Example with a double roll laminator in the same manner as in Example 6. Since, however, the electrolytic-solution-supporting polymer film had no sufficient mechanical properties, the electrolytic-solution-supporting polymer film was collapsed, and no good battery element was prepared.

Example 7
[Composite Electrolytic-solution-supporting Polymer Film]

A composite electrolytic-solution-supporting polymer film was prepared in the same manner as in Example 6 except that the polymer resin for a gelled electrolyte was replaced with a polymer (VdF-HFP) obtained by copolymerizing VdF and 5 mol %, based on VdF, of hexafluoropropylene (HFP). The obtained electrolyte film had the following properties; an average thickness of 45 μm (a 4 to 5 μm thick polymer electrolyte layer was present on each surface of the composite film), a puncture strength of 450 g, an ionic conductivity of $1.3 \times 10^{-3}$ S/cm (25° C.) and a TMA heat resistance temperature of >400° C.

[Positive electrode]

A paste of a positive electrode material was prepared from 85 parts by weight of a lithium cobaltate ($LiCcO_2$, supplied by Kansai Syokubai), 5 parts by weight of carbon black and a solution of 12% by weight of VdF-HFP in tetrahydrofuran (THF) which was to give a VdF-HFP (used as a binder in the above polymer electrolyte) in a dry weight of 10 parts by weight and 20 parts by weight of a non-aqueous electrolytic solution of 1 M of $LiBF_4$ in PC/EC (1/1 (weight ratio)). The obtained paste was applied onto a 20 μm thick aluminum foil and dried at 50° C. to remove THF, whereby a 120 μm thick positive coating holding non-aqueous electrolytic solution was obtained.

[Negative Electrode]

A paste of a negative electrode material was prepared from 90 parts by weight of a mesophase carbon microbeads (MCMB, supplied by Osaka Gas Chemical) as a carbonaceous negative electrode material and a solution of 12% by weight of VdF-HFP in tetrahydrofuran (THF) which was to give a VdF-HFP (used as a binder in the above polymer electrolyte) in a dry weight of 10 parts by weight and 20 parts by weight of a non-aqueous electrolytic solution of 1 M of $LiBF_4$ in PC/EC (1/1 (weight ratio) The obtained paste was applied onto a 18 μm thick copper foil and dried at 50° C. to remove THF, whereby a 125 μm thick negative electrode coating holding the non-aqueous electrolytic solution was obtained.

[Preparation of Battery]

A battery element formed of a positive electrode/composite electrolytic-solution-supporting polymer film/negative electrode laminate and a sheet-shaped battery having the above battery element sealed in aluminum laminate films were prepared in the same manner as in Example 6. It was found that the positive electrode and the electrolytic-solution-supporting polymer film were bonded to each other at 35 gf/cm, and that the negative electrode and the same polymer film were bonded to each other at 24 gf/cm. It was thus seen that excellent interfacial bonding was accomplished. The obtained sheet-shaped battery was charged and discharged at a current density of 1 $mA/cm^2$ in the same manner as in Example 6, and it was found that repeated charging and discharging were possible. In this case, the initial discharging showed a current efficiency of 79%, and further, the discharge amount per a negative electrode carbon weight was 196 mAh/g.

Comparative Example 9
[Composite Electrolyte-supporting Film]

The same aramid porous reinforcing material and the same polymer electrolyte dope as those in Example 7 were provided, and a composite electrolytic-solution-supporting polymer film in which the reinforcing material was impregnated with an electrolytic-solution-supporting polymer was prepared in the same manner as in Example 7. In this case, however, the amount of the electrolytic-solution-supporting polymer used for impregnating the reinforcing material was decreased. Therefore, the composite film had an average thickness of 36 μm, which was almost the same as the thickness of the reinforcing material alone. Reinforcing material was partly exposed on each surface of the composite film. Other properties of the composite film were as follows; a puncture strength of 428 g, an ionic conductivity of $1.1 \times 10^{-3}$ S/cm (25° C.) and a TMA heat resistance temperature of >400° C.

[Preparation of Battery]

The above composite electrolytic-solution-supporting polymer film and the same positive electrode and the same negative electrodes as those in Example 7 were thermally press-bonded with a double roller laminator in the same manner as in Example 6. This laminated element was subjected to a peel test to show that the positive electrode and the electrolytic-solution-supporting polymer film had an average peel strength of as low as 5 gf/cm and that the negative electrode and the same polymer film had an average peel strength of as low as 3 gf/cm. It was visually observed that the positive electrode and the negative electrodes had portions which were not at all bonded (had no junction) to the electrolytic-solution-supporting film, and it was thus seen that no excellent interfacial bonding was accomplished.

Effect of the Invention

As explained in detail hereinabove, the present invention can provide a high-safety electrolytic-solution-supporting polymer film which has all of a high ionic conductivity, a high short circuit prevention strength and a high mechanical heat resistance and which is useful for a polymer secondary battery.

What is claimed is:

1. An electrolytic-solution-supporting polymer film, comprising:
   a porous reinforcing material (A) which is formed of an aromatic polyamide and has a thickness of 100 μm or less;
   a polar organic polymer compound (B) held in said porous reinforcing material; and
   an electrolytic solution (C) which comprises a polar organic solvent (c1) and an electrolyte (c2) and which is integrated with said polar organic polymer compound and is in a gelled state, the electrolytic-solution-supporting polymer film having a thickness of 200 µm or less, an ionic conductivity of at least 5×10⁻⁴ S/cm at 25° C., a puncture strength of at least 150 g and a mechanical heat resistance of at least 300° C.

2. The film of claim 1, wherein the porous reinforcing material (A) is a three-dimensional network film having a thickness of 50 µm or less, a puncture strength of at least 100 g and a gas permeability of 10 sec/100 cc·in² or less.

3. The film of claim 2, wherein the porous reinforcing material (A) is a porous thin film having a MacMullin number of 5 or less.

4. The film of claim 1, wherein the porous reinforcing material (A) is a non-woven fabric, a woven fabric or a fiber.

5. The film of claim 4, wherein the porous reinforcing material (A) is a non-woven-fabric-shaped sheet having a basis weight of 8 to 35 g/m².

6. The film of claim 1, wherein the polar organic polymer compound (B) is a polyvinylidene fluoride compound.

7. The film of claim 6, wherein the polyvinylidene fluoride compound is a copolymer formed from vinylidene fluoride and a perfluoro lower alkyl vinyl ether as main components.

8. The film of claim 7, wherein the perfluoro lower alkyl vinyl ether is perfluoromethyl vinyl ether.

9. The film of claim 8, wherein the polyvinylidene fluoride compound is a copolymer formed from vinylidene fluoride (VdF) and perfluoromethyl vinyl ether (PFMV) in a VdF/PFMV molar ratio of 98/2 to 90/10.

10. The film of claim 6, wherein the polyvinylidene fluoride compound is a copolymer formed from vinylidene fluoride and hexafluoropropylene as main components.

11. The film of claim 10, wherein the polyvinylidene fluoride compound is a copolymer formed from vinylidene fluoride (VdF) and hexafluoropropylene (HFP) in a VdF/HFP molar ratio of 98/2 to 90/10.

12. The film of claim 1, wherein the polar organic solvent (c1) is at least one liquid selected from the group consisting of propylene carbonate, ethylene carbonate, butylene carbonate, dimethyl carbonate, diethyl carbonate, methyl ethyl carbonate, 1,2-dimethoxyethane, 1,2-diethoxyethane and γ-butyrolactone.

13. The film of claim 1, wherein the electrolyte (c2) is at least one electrolyte selected from the group consisting of lithium perchlorate, lithium hexafluorophosphate, lithium borotetrafluoride, lithium trifluorosulfonate, lithium perfluoromethylsulfonylimide and lithium perfluoroethylsulfonylimide.

14. The film of claim 1, wherein at least 100 phr, based on the polar organic polymer compound (B), of the electrolytic solution (C) is supported.

15. The film of claim 1, wherein the electrolytic-solution-supporting polymer has a thickness (a) and the porous reinforcing material has a thickness (b) in a a/b thickness ratio of from 1.05 to 2.0.

16. The film of claim 1, wherein the film has a total holding capacity of at least 80 phr of the electrolytic solution and an intensely holding capacity of 50% based on the total holding capacity.

17. A polymer electrolyte secondary battery, wherein a positive electrode having a positive electrode material which holds an electrolytic solution and occludes and releases lithium ion and a negative electrode having a carbonaceous negative electrode material which holds an electrolytic solution and occludes and releases lithium ion are joined to each other through an electrolytic-solution-supporting polymer film, the electrolytic-solution-supporting polymer film having an ionic conductivity of at least 5×10⁻⁴ S/cm at 25° C., a puncture strength of at least 150 g and a mechanical heat resistance of at least 300° C.

18. The polymer electrolyte secondary battery of claim 17, wherein the electrolytic-solution-supporting polymer film is an electrolytic-solution-supporting polymer film comprising a porous reinforcing material (A) which is formed of an aromatic polyamide and has a thickness of 100 µm or less, a polar organic polymer compound (B) held in said porous reinforcing material and an electrolytic solution (C) which comprises a polar organic solvent (c1) and an electrolyte (c2) and which is integrated with said polar organic polymer compound and is in a gelled state, the electrolytic-solution-supporting polymer film having a thickness of 200 µm or less.

19. The battery of claim 18, wherein the positive electrode and the electrolytic-solution-supporting polymer film are bonded to each other, and the negative electrode and the electrolytic-solution-supporting polymer film are bonded to each other, at a peel strength of at least 10 gf/cm each.

20. A process for producing a polymer electrolyte secondary battery, which comprises:

stacking a positive electrode holding electrolyte, an electrolytic-solution-supporting polymer film holding electrolyte, and a negative electrode holding electrolyte in this order; and laminating the stacked films by a thermal press-bonding method, wherein the electrolytic-solution-supporting film comprises a porous reinforcing material (A) which is formed of a high-strength heat-resistant resin and has a thickness of 100 µm or less, and the electrolytic-solution-supporting polymer film has a gelled electrolytic-supporting polymer content of 30 to 85% by weight, and has an average thickness which is 1.05 to 2.0 times as large as an average thickness of the porous reinforcing material (A).

21. A electrolytic-solution-supporting polymer film having an ionic conductivity of at least 5×10⁻⁴ S/cm at 25° C., a puncture strength of at least 300 g and a mechanical heat resistance of at least 300° C.

22. A polymer electrolyte secondary battery comprising a positive electrode, an electrolytic-solution-supporting polymer film having an ionic conductivity of at least 5×10⁻⁴ S/cm at 25° C., a puncture strength of at least 300 g and a mechanical heat resistance of at least 300° C., and a negative electrode.

* * * * *